DIRECTION OF MAGNETIZATION

INVENTOR.
Walter S. Blume.
BY Wood, Herron & Evans.
ATTORNEYS.

United States Patent Office 3,211,966
Patented Oct. 12, 1965

3,211,966
PERMANENT MAGNETS HAVING A PLURALITY
OF OPENINGS THEREIN
Walter S. Blume, Cincinnati, Ohio, assignor to Leyman
  Corporation, Cincinnati, Ohio, a corporation of Ohio
Continuation of application Ser. No. 16,075, Mar. 18,
  1960. This application Sept. 17, 1963, Ser. No. 309,567
                9 Claims. (Cl. 317—158)

This application is a continuation of application Serial No. 16,075, filed March 18, 1960, now abandoned.

This invention relates to an improvement in permanent magnets and, more particularly, to a method of increasing the induction and holding power of permanent magnets.

The induction, or flux density, of a permanent magnet is a measure of the field established by the magnet. Specifically, the induction B is the number of lines of force crossing a unit area. The holding power of a magnet is the reactive force it displays, in terms of the weight of a magnetic object which it can lift.

I have discovered that the induction and holding power of many permanent magnets can be greatly increased simply by forming apertures through the magnet extending substantially parallel to the direction of magnetization of the magnet.

This increase in holding power and induction can be obtained in permanent magnets of various sizes and shapes, although it is most vivid in a permanent magnet of sheet or slab form having a surface area which is large in relation to its thickness. Furthermore, the increases can be obtained regardless of the materials of which the magnet is comprised or of the process by which it is fabricated.

Heretofore, permanent magnets of sheet or slab form magnetized in directions normal to their large surfaces have displayed very little induction and holding power. Typically, such a magnet is unable even to hold itself onto a vertical magnetic surface, and consequently has been of little or no utility. In accordance with this invention, however, by forming apertures through a sheet magnet, its holding power can be greatly increased, so much so, in fact, that it can hold many times its own weight.

While the increases in holding power and induction effected by this invention are the greatest in permanent magnets of sheet or slab form, the invention is also applicable, for example, to short bar, cylindrical, or block magnets.

In general, the invention is applicable to those permanent magnets having poles the surface areas and dimensions of which are about equal to or larger than the distance between the poles.

The invention is not limited to the provision of any particular number of holes or apertures in a magnet, or to any particular size or arrangment of holes, although there may be a certain relationship between a particular magnet and the arrangement, size and number of holes which provides the maximum increase in holding power and induction for that magnet.

When apertures are formed in a magnet, as, for example, by punching holes in a sheet magnet, the quantity of magnetic material in the magnet is diminished. Consequently, one would except that, because of the lesser quantity of material constituting it, the apertured magnet would be weaker, not stronger, than the unapertured magnet. I have discovered the surprising result that contrary to expectation, the provision of holes in the magnet can improve rather than lessen the induction and holding power of the magnet. In other words, although less magnetic material is present, an appropriately apertured magnet displays better holding power than an unapertured magnet of the same overall dimensions. The improvement in holding power does not continue to increase indefinitely with the provision of more and/or larger apertures, for this would lead to the absurdity of a very small amount of magnetic material providing a huge holding force, and unless the material is very large in relation to its thickness the best results are usually obtained when the total area of the apertures is less than roughly about half the total polar area of the magnet. It is in no sense critical that the number, size or arrangement of apertures be optimum for the invention to be of utility; an improvement of some magnitude is obtained by the provision of any size, number or arrangement of apertures in a magnet, up to that point at which so little magnetic material remains that induction and holding power finally diminish beyond what they were in the unapertured magnet.

The invention may best be further explained in relation to the accompanying drawings, in which.

A preferred embodiment of my invention is a permanent magnet in sheet form provided with a series of regularly shaped, uniformly distributed holes. However, as previously noted, an improvement in holding power is attained regardless of whether the holes are uniformly spaced or of uniform size. The apertures need not be regular in outline; for the sake of appearance and ease of manufacture, it is preferable that they be regular, but from the standpoint of improvement in magnetic quality, the holes may be of any shape.

Figure 1:
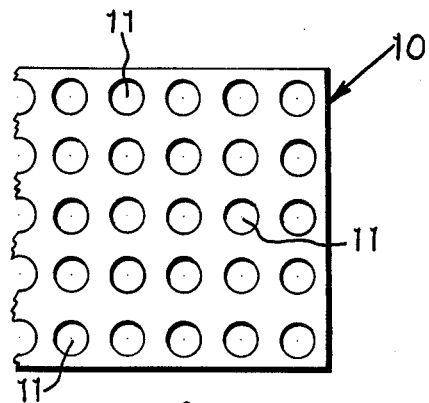
FIGURE 1 is a plan view of a regularly shaped piece of magnetic material in sheet form having regularly spaced perforations.
Figure 2:
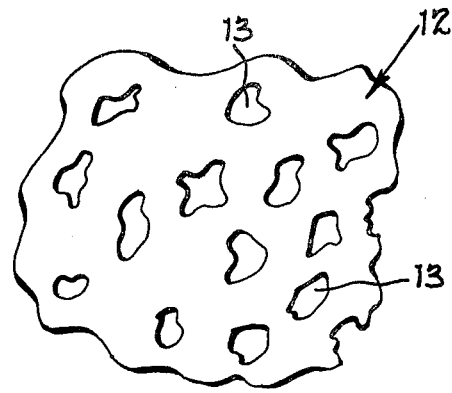
FIGURE 2 is a plan view of a sheet of magnetic material of irregular outline having irregular openings.

Thus, in FIGURE 1, a sheet of magnetic material of rectangular outline is shown at 10. The sheet is provided with regularly spaced apertures 11 in the form of circular holes. In FIGURES 2 is shown a sheet 12 of irregular outline provided with irregular apertures 13. The improvement in magnetic qualities effected by this invention is displayed in sheets of the type illustrated in FIGURE 2 as well as in those of the type illustrated in FIGURE 1. The area of the apertures is somewhat less than half the overall area of the sheet.

Without intending to limit the invention, I have proposed the following explanation to account for the improvements obtainable in accordance with this invention:

One of the factors which determines the induction and holding power of any given permanent magnet is its air gap. This is the region in space traversed by the imaginary lines of flux as they pass from the north pole to the south pole of the magnet. In a horseshoe magnet, the air gap is the region in space between the two ends of the U.

The air gap is the magnetic analog of the electrical resistor. The bigger the gap of any given magnet, the less the flux across it, and the "weaker" the magnet, both in induction and in holding power.

Figure 3:
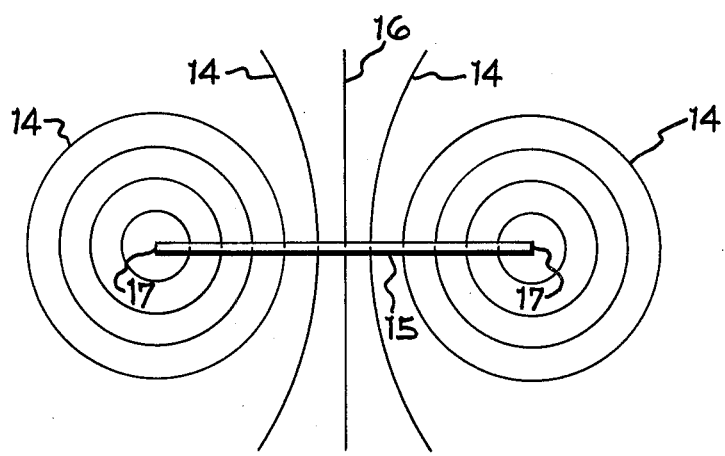
FIGURE 3 is a diagrammatic section of an unperforated sheet of magnetic material having its poles on opposite surfaces, showing the lines of flux.

In a permanent magnet of sheet form having its poles on its opposed faces, the air gap is the region in space traversed by the flux lines as they move from the north pole, curve around the edge of the sheet, and return to the south pole. In FIGURE 3, the lines of flux 14 generated in space by an unperforated magnetic sheet 15 extend normally to the sheet at its center, as at 16, and elsewhere curve around the edges 17 of the sheet from one surface to the other in curved, nonintersecting paths. Quantitatively, the size of the air gap of any given magnet is the average length of these lines. Where the sheet is large, the air gap is very large, and holding power is correspondingly low.

When the sheet is perforated in accordance with this invention, the average air gap is apparently diminished, because the flux lines can move from the north to the south pole through the openings in the magnet in preference to going around the edge of the sheet, a much greater distance.

Figure 4:
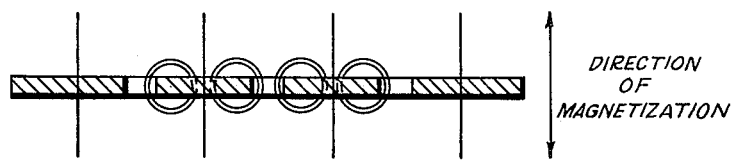
FIGURE 4 is an enlarged diagrammatic section of a sheet magnet perforated in accordance with the invention, showing the lines of flux.

Thus, in FIGURE 4, the average air gap traversed by the lines of flux of a magnet having perforations is seen to be very much less than that of the unperforated magnet of FIGURE 3, and the strength of the magnet is increased, in accordance with the observed results.

In magnets which, even if not of sheet form, do have relatively large air gaps in relation to interpole distance, because of large surface areas at the poles, the provision of holes in the magnet parallel to the direction of magnetization can effectively shorten the air gap, so that induction and holding power are increased. Thus, the holes between the polar surfaces of the magnets serve as "short cuts" or channels for the lines of flux, shortening the pole-to-pole distance which they would otherwise have to traverse.

In terms of the air gap theory, I have discovered that the holding power and induction of a permanent magnet can be increased by removing a portion or region of the polar area of the magnet whereby the effective air gap of the magnet is shortened. Otherwise put, in terms of the same theory, a permanent magnet having interpole channels for the lines of flux will display improved induction and holding power, provided the total sectional area of the channels is not too large in relation to the total polar surface area of the magnet.

The invention is particularly suitable to be practiced with materials into which apertures can be punched mechanically, as by a hand punch or a punch press. For instance, the invention can be utilized with sheets rolled from the various permanent magnet steels which have been developed. More desirable than steel magnets are the recently developed "fine particle" magnetic materials such as barium ferrite, which display magnetic qualities much superior to those of the classical steel bar magnet. One such fine particle permanent magnet material is described in my issued Patent No. 2,999,275, issued September 12, 1961.

While I have described the preferred form of this invention it will be understood that the invention can also be practiced in other modifications and variations coming within the scope of the following claims.

I claim:

1. A permanent magnet in sheet form having a magnetic axis which is substantially perpendicular to the plane of the sheet and having a plurality of opening extending through it interiorly of its margin, said openings being approximately equally spaced from each other, the area of said openings being a minor portion of the area of said sheet, the holding power of said magnet being substantially improved by the presence of said openings, relative to a similar magnet having no such openings.

2. A permanent magnet in sheet form having a magnetic axis which is substantially perpendicular to the plane of the sheet and having a plurality of openings extending through it interiorly of its margin, said openings being substantially equally spaced from each other and from the margins of said sheet, the area of said openings being a minor portion of the area of said sheet, the holding power of said magnet being substantially improved by said openings as compared to a similar magnet which contains no such openings.

3. A permanent magnet in sheet form having a magnetic axis which is substantially perpendicular to the plane of the sheet and having a plurality of openings extending through it interiorly of its margin, said openings being arranged in a substantially regular pattern, the area of said openings being a minor portion of the area of said sheet, the induction of said magnet being increased by said openings.

4. A permanent magnet in sheet form having a magnetic axis which is substantially perpendicular to the plane of the sheet and having a plurality of openings extending through it interiorly of its margin, said openings being substantially uniform in size and shape and being uniformly spaced in said sheet, the area of said openings being a minor portion of the area of said sheet, the holding power of said magnet being increased by the presence of said openings in said sheet.

5. A permanent magnet having pole surfaces which are large in relation to the magnetic distance between them, said magnet having a plurality of spaced holes extending through it from one pole surface to the other pole surface, the holding power of said magnet being improved by the presence of said holes between said pole surfaces.

6. A permanent magnet in accordance with claim 5 in which said holes form a regular pattern.

7. A permanent magnet of sheet form having its poles on its large surfaces, said magnet having a plurality of spaced apertures extending through it between said large surfaces, whereby the effective air gaps between said poles are substantially shortened, the induction of said magnet thereby being substantially improved.

8. A permanent magnet in accordance with claim 7 in which said apertures form a regular pattern over said large surfaces.

9. A permanent magnet in accordance with claim 7 in which said apertures are of substantially equal size and shape and are regularly arranged.

References Cited by the Examiner

UNITED STATES PATENTS

| | | | |
|---|---|---|---|
| 2,825,046 | 2/58 | Herbert et al. | 340—174 |
| 2,952,840 | 9/60 | Ridler et al. | 340—174 |
| 3,009,225 | 11/61 | Budreck | 317—159 X |

LARAMIE E. ASKIN, *Primary Examiner.*

JOHN F. BURNS, *Examiner.*